Patented June 21, 1938

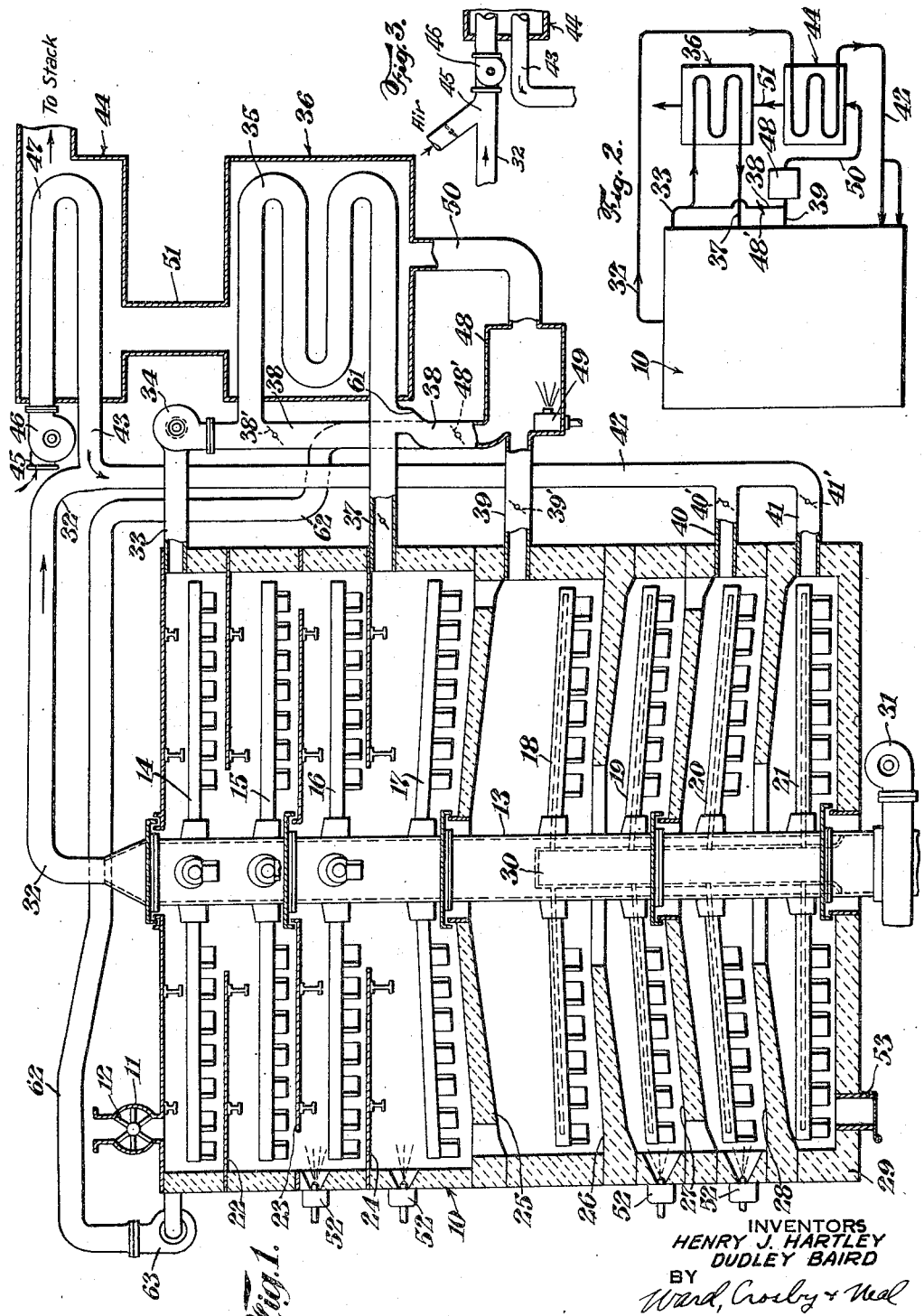

2,121,661

UNITED STATES PATENT OFFICE 2,121,661

PROCESS AND APPARATUS FOR DRYING AND BURNING MOIST MATERIALS

Henry J. Hartley, Hastings on Hudson, N. Y., and Dudley Baird, Berkeley, Calif., assignors to Nichols Engineering & Research Corporation, New York, N. Y., a corporation of Delaware Application August 14, 1936, Serial No. 95,950

21 Claims. (Cl. 110—12)

This invention relates to methods and apparatus for drying and burning various moist materials, such for example as sewage sludge, and embodies various improvements and modifications of the method and apparatus of the patent to Dudley Baird and Robert W. Rowen, No. 2,015,050, granted September 17, 1935.

This invention in one of its phases is directed to economizing features whereby the incineration process may be maintained under normal conditions once it is started, without requiring the use of extraneous fuel. That is, the fuel value of the sewage sludge or other waste material, even when embodying a substantial water content, is utilized with such a high degree of efficiency that the use of any other fuel may be avoided, thus effecting a very great saving in the annual operating costs of the equipment.

With the apparatus disclosed in the above mentioned patent to Baird and Rowen, sewage sludge or the like is first treated as by filtering for example, to eliminate some of the water content and to form filter cake or the like, which is introduced into a multiple hearth furnace and rabbled over each hearth and from hearth to hearth down through the furnace in the presence of a countercurrent stream of combustion air, evolved gases and vapors. The gases and vapors and remaining air are withdrawn at the top of the furnace and then passed through a recuperator to preheat the supply of intake air for the furnace. While with this arrangement, sewage sludge may be incinerated at a cost generally far below that of carting away and disposal of the sludge on free dumps and the process may sometimes be carried on for considerable periods without the use of extraneous fuel, yet if the quantities of the sludge supply or its moisture content are irregular as is generally the case, then considerable fuel must be burned, so that this item will be one of the largest of the operating costs. With such equipment it appears necessary or advisable to subject the gases and vapors evolved from the sludge being dried and incinerated, to a temperature in the neighborhood of 1100° F. or higher at some point after these gases and vapors leave the sludge and before they are discharged to the atmosphere, in order to assure elimination of obnoxious odors therefrom. Thus, when these gases and vapors leave the furnace, they ordinarily evolve a great quantity of heat. While as disclosed in said patent to Baird and Rowen, the major portion of such heat may be recovered in a recuperator used to preheat the intake air, yet even after all of the intake air is preheated to as high a temperature as is possible in a practical recuperator, there will still be an excess of useful heat available in the gas, vapor and air mixture discharged from the recuperator to the stack. This remaining useful heat cannot be practically absorbed by merely heating more intake air, because it will ordinarily serve no useful purpose to supply a larger quantity of intake air than is required for combustion purposes, plus a factor of safety, say of 50%. Any use of a larger quantity of preheated intake air will merely require that more air be heated up to incineration temperatures within the furnace, to no advantage. A mere increase in size or extent of the recuperator will not result in a recovery of the excess useful heat in the exit gases, because as above stated, a recuperator of reasonable normal size will heat all of the intake air which it is advisable to use, to a temperature as near that of the exit gases as is possible with any recuperator of commercially practical efficiency.

Since the exit gases from furnaces of the type disclosed in the Baird and Rowen patent, include substantial quantities of water vapor evolved from the drying sludge as well as evolved gaseous products of combustion, these exit gases and vapors will not only be greater in weight than the intake air, but the specific heat of the exit gas and vapor mixture will be substantially higher than that of the intake air. These factors present a difficult problem in attempting to transfer all of the useful heat of the exit gases and vapors into the intake air, or otherwise back into the furnace so as to save enough of the heat of the exit gases and vapors to safely avoid the necessity of using extraneous fuel.

According to the present invention, we have solved this problem by transferring heat from the exit gases and vapors not only to the intake air of the furnace, but also to a stream of vapors which are recirculated over the drying hearths of the furnace. That is, if vapor evolved from drying sludge is forcibly recirculated over the drying hearths, a substantial quantity of vapor or vapor and gas mixture of relatively high specific heat is available, into which substantial quantities of the excess heat from the exit gases of the furnace may be transferred, in addition to transferring heat into the intake air supply for the furnace. Accordingly we are able to discharge the exit gases and vapor from the equipment to the stack without their embodying any substantial amount of waste heat, and enough of the heat thereof is recovered and restored to the furnace to safely permit the process to be maintained without extraneous fuel, even though there may be considerable fluctuation in the quantity and water content of the sludge supply.

Another feature which may be embodied in our invention involves means whereby the above mentioned recirculated stream of vapor, after being preheated in a recuperator, is reintroduced into the furnace at a point where it will not enter the incineration hearth spaces and thereby cause any blanketing effect upon the combustion taking place therein. Also according to our invention, the hot gaseous products of combustion from the incineration hearths may be withdrawn at a high temperature from the incineration hearths, such high temperature gases thereupon being mixed with vapor separately withdrawn from the drying hearths, so that such vapor is raised to a temperature sufficient to assure elimination of odors thereof, the resulting mixture thereafter being brought into heat exchanging relationship both with the furnace intake air and with the above mentioned recirculated stream of vapor. In this way, the vapor may be heat treated at a high temperature without introducing the same into the high temperature incineration hearths where proper incineration conditions might be interfered with.

Various further and more specific objects, features and advantages will clearly appear from the detailed description given below taken in connection with the accompanying drawing which forms a part of this specification and illustrates merely by way of example preferred forms of the apparatus of the invention.

The invention consists in such novel features, arrangements and combinations of parts as may be shown and described in connection with the apparatus herein disclosed, and also such novel methods and combinations of method steps as are disclosed and described herein.

In the drawing Fig. 1 illustrates one form of apparatus embodying the invention and in which the methods of the invention may also be carried out.

Fig. 2 schematically illustrates an alternative embodiment of the invention, and Fig. 3 is a view illustrating an alternative arrangement of part of the conduits in the apparatus of Fig. 1.

Referring to Fig. 1, a multiple hearth furnace is shown at 10 which may be of a type generally similar to that of the above mentioned Patent No. 2,015,050. As explained in said patent, sewage sludge as produced in sewage treatment plants may first be passed through a suitable filter or other dewatering equipment to provide a solid or semi-solid filter cake or the like having a moisture content ranging from in the neighborhood of 50-60% up to 85%, for example. In most cases a sewage sludge filter cake having a moisture content of in the neighborhood of 70% may be readily obtained, although of course the invention may be used to incinerate a cake having a lower or higher moisture content.

After a substantial portion of the moisture has been thus eliminated, the sludge may be conveyed to the top of the multiple hearth furnace and introduced therein through a suitable inlet feeding device 11 designed to more or less continuously admit the sludge into the top of the furnace and at the same time serving to seal the inlet opening against escape of gases at this point. In the particular form shown the feeding device 11 may include a revolving member 12 having a number of vanes forming pockets for receiving the sludge and delivering it to the furnace and at the same time serving to seal off the inlet against escape of gases.

The multiple hearth furnace 10 may comprise a rotatable hollow central shaft 13 extending vertically up through the middle of the furnace and carrying a plurality of rabble arms as at 14 to 21 inclusive for rabbling the material in succession over the superposed hearths 22 to 29 respectively. It will be understood that alternate hearths such as hearths Nos. 22, 24, 26 and 28 may be provided with central discharge openings, whereas the remaining hearths may be formed with peripheral discharge openings whereby the material may be rabbled inwardly and outwardly of alternate hearths respectively and down through the furnace while being first dried and then incinerated. The entire furnace structure may be enclosed within a cylindrical wall in the usual manner.

In the particular example shown, hearths Nos. 25 to 29 may be constructed of brick or the like in the usual manner. At least the greater part of the incineration will occur on these hearths and accordingly they are constructed in a manner to resist high temperatures. On the other hand, the greater part of the drying of the sludge may occur on hearths Nos. 22, 23 and 24 and these hearths may be constructed of a suitable heat resistant alloy steel to facilitate the efficient transmission of heat from the hearths below into the underside of the layers of sludge on each drying hearth, whereby the drying may proceed more efficiently and rapidly.

The central shaft 13 may be provided with an internal conduit 30 receiving air from a blower or the like at 31 and conducting such air into internal conduits within rabble arms 18 to 21 inclusive (and also arms 14 to 17—if desired), in a manner similar to the cooling conduit arrangement in the shaft and rabble structure of the above mentioned Patent No. 2,015,050. That is, the cooling air may pass up through the internal shaft conduit 30, then through the internal conduits of the lower rabble arms to the ends of such arms and back through the outer annular spaces in the rabble arms to the annular space within shaft 13 exteriorly of conduit 30. The cooling air upon reaching such annular space, will of course be substantially preheated and this preheated air may be conducted through the upper part of shaft 13 and out through a conduit 32.

In the particular construction shown, the three upper hearths are each indicated as provided with four rabble arms in order to insure frequent rabbling of the relatively bulky wet material being dried on these hearths. On the other hand, the lower hearths are shown as each provided with but a single pair of rabble arms so that the sludge material being incinerated on the lower hearths will rest for a somewhat longer period on each hearth to enable thorough incineration. It will of course be understood that a greater or lesser number of the drying hearths and incinerating hearths may be provided, depending upon the particular conditions met with in each installation, and the ratio of the number of drying hearths to the number of incinerating hearths may be altered to suit various conditions.

In the construction shown, as the material is rabbled over the various drying hearths as at 22 to 25 inclusive, it comes in contact with a countercurrent stream of hot vapor rising up through the various discharge ports of these hearths and over each of these hearths in succession. A substantial portion of this stream of vapor is recirculated over the drying hearths. That is, such vapor may be passed out from above an upper hearth through a conduit 33, and forced by a fan 34 through conduits 35 of a recuperator 36, thence back into the furnace through conduit 37 at a point above hearth 25, for example. In passing through recuperator conduits 35, this stream of vapor becomes heated in a manner hereinafter explained, so that the drying hearths are continually being provided with a stream of hot vapor sufficient to partially dry the sludge before it is passed into the lower incineration zones. As excess vapor accumulates in this portion of the furnace, it may be forced out by blower 34 through a branch conduit 38, and thereafter treated to eliminate possible odors in a manner hereinafter explained.

The recirculated vapor serves as a medium of high heat absorbing capacity for carrying heat from the waste gases passing through recuperator 36, back into the furnace, i. e., heat which might otherwise be wasted in the exit gases. Most of the heat thus recovered is in excess of the heat which could be recovered merely by the preheating of the limited quantity of furnace intake air in recuperator 44. The intake air because of its limited volume and relatively low specific heat (as compared with vapor), does not have sufficient heat absorbing capacity to provide a medium for restoring all of the utilizable waste heat to the furnace. The recirculated vapor stream therefore provides a convenient medium for this purpose to supplement the heat recovering function of the intake air stream.

The above described recirculation of the vapor also insures that all particles of the drying sludge will have opportunity to come repeatedly into contact with considerable volumes of the hot vapor, which may even be somewhat superheated, further insuring more uniform and complete drying.

Furthermore, the recirculation of the vapor in the drying hearths also tends to check premature combustion or scorching of the surfaces of the partially heated sludge. Such premature scorching would tend to create serious odors. However, the recirculating vapor tends strongly to prevent such scorching until the sludge is uniformly and fully heated to ignition temperatures. Thereafter, when the uniformly heated sludge falls into the incineration portion of the furnace, it is in condition for prompt and uniform combustion with the production of sufficient heat immediately at the incineration zones to insure destruction of the odors of the evolved gases.

The volume of recirculating vapor at the drying hearths as above described, also provides in effect a reservoir of heat available for promptly heating any irregular excess supplies of sludge, thus avoiding danger of discharging cold masses into the incineration zones, such as might cause incomplete and irregular burning with consequent troublesome odors.

As the comparatively dry waste material is rabbled over the various incineration hearths such as hearths 26 to 29 inclusive, it comes in contact with a countercurrent stream of evolved gases of combustion and air rising up through the various discharge ports of these hearths and over each incineration hearth up through this portion of the furnace, and thence out through a conduit as at 39, connecting for example with the space over hearth 26 or an adjacent hearth where the temperatures are at substantially the maximum within the furnace. The air for supporting combustion may be introduced at one or more of the lower hearths, as through conduits 40 and 41, for example. The intake openings from these conduits, although shown in vertical alignment for simplicity, may preferably be arranged in angularly spaced relationship around the lower hearths of the furnace so as to insure an adequate supply of air for combustion purposes at the various portions of each hearth. Air may be supplied to the conduits as at 40 and 41 through a conduit 42, which in turn may receive preheated air from two sources, namely conduit 32 carrying air preheated by passage through the rabbling structure, and secondly from a conduit 43 leading from a recuperator 44. That is, fresh air may be introduced as at 45 and forced by a blower 46 through conduit 47 of recuperator 44, whereby such air is preheated in a manner hereinafter further explained, before passage through conduits 43 and 42.

The hot gaseous products of combustion, together with excess air not used for combustion, upon passing through conduit 39, become mixed with the vapors withdrawn from the drying zones of the furnace through conduit 38, within a conduit or chamber 48. The gases and air as withdrawn from the furnace through conduit 39 are at a temperature sufficiently above approximately 1100° F. so that when the same become mixed with vapor from conduit 38, the resulting mixture will be at a temperature in the neighborhood of 1100° F. to thereby decompose any possible odoriferous content that may exist in the vapor withdrawn from the drying zones. To insure that this temperature will be acchieved within this mixture of gases and vapor, an oil or gas burner as at 49 may be provided within the conduit or chamber 48. While it will ordinarily be unnecessary to operate this burner during the normal operation of the equipment with the particular arrangements of the apparatus shown, yet when the equipment is subjected to unusual operating conditions or when it is desired to rapidly start the process, such a burner may be useful in insuring thorough elimination of odors from the gas and vapor mixture at this point.

From the conduit or chamber 48, the gas and vapor mixture may pass through conduit 50 to the space within recuperator 36 and in heat exchanging relationship with the vapor passing through conduit 35 within said recuperator. Thereby a substantial portion of the heat value of the gas and vapor mixture is transferred to the stream of vapor recirculated through the drying hearths of the furnace. After passage through recuperator 36, the gas and vapor mixture may pass through a conduit 51 into recuperator 44 and into heat exchanging relationship with the air supply passing through conduit 47 of the latter recuperator. Thereby the temperature of the gas and vapor mixture is further lowered to a point where there is little remaining heat therein available for recovery and utilization in the incineration equipment. Accordingly the gas and vapor mixture from recuperator 44 may be passed either into a heating system for the plant or to a stack for discharge to the atmosphere. This gas and vapor mixture will embody practically no smoke and as a result of the thorough heat treatment thereof as above explained, it will embody no perceptible odor and may therefore be discharged to the atmosphere without danger of annoyance to the inhabitants of the vicinity. Since the gaseous products of combustion are withdrawn through conduit 39 from one of the hottest parts of the furnace, this will insure that all of such gases will be subjected to substantially the highest temperature available in the furnace to thoroughly eliminate odors therefrom.

In order to preliminarily bring the furnace structure up to the desired operating temperatures for starting the process or to provide sufficient heat to meet any unusual conditions, a number of fuel burners as at 52 may be provided at various hearths of the furnace.

The above described circulation of the air, gases and vapor through the various parts of the equipment, may be controlled by regulating the speed of the various blowers or fans and by regulation of dampers as at 38′, 39′, 40′, 41′ and 48′. The use of several blowers at various points in the system, together with the suction effect from the stack, enables the pressure as applied to the gases, air and vapor to be distributed at several points located between the various sections of the equipment which offer resistance to the gas flow. Thus the gas, air or vapor pressure within the various parts of the equipment need not differ very widely from atmospheric pressure and hence the danger of any excess pressures which might cause odoriferous gases to escape into the plant through inspection doors, etc., is avoided. Also any substantial sub-atmospheric pressures which might cause an excess of cold air to be drawn into the equipment, are avoided.

The ash resulting from the incineration of the sewage sludge or other waste material, may be finally passed out through a discharge opening at 53 at the bottom of the furnace.

With the equipment as above described, using a furnace of eight hearths and about 20 feet in outside diameter, at least 125 tons of filter cake embodying 75% moisture (having dry solids which are 50% combustible) may be treated in twenty-four hours. With such operation the temperature of the exit gases passing through conduit 39, may be readily maintained sufficiently higher than 1100° F. so that the vapor and gas mixture in chamber 48 is at a temperature of 1100° F. or higher. With the use of the recuperator 36 as above described, the vapor leaving the upper part of the furnace through the branch conduit 38 during such operation, will be at a temperature of about 450° F. before being mixed with the hot gases, whereas the vapor reintroduced to the drying hearths through conduit 37, will be heated to about 850° F. The gas and vapor mixture upon its passage through recuperator 36, will be reduced from a temperature in excess of 1100° F. or thereabouts to a temperature of about 550° F., and upon passage through the recuperator 44, the mixture will be reduced to a temperature of 400–420° F. or thereabouts. Meanwhile, the intake air entering at 45 will be raised in temperature in the recuperator 44 from room temperature, say 60° F., to about 475° F. with the operation as above described. The air introduced through blower 31 on passage through the cooling conduits of the rabbling system, will become preheated to a temperature of about 400° F. so that this air together with the air preheated in recuperator 44 will provide an adequate quantity of air supply at the bottom of the furnace, heated sufficiently to insure prompt and thorough incineration of the waste material in the incineration zones. The above temperatures are given on the basis of operating the equipment without using the fuel burners once the equipment has been brought up to temperature. Thus it is apparent that with sludge containing as much as 75% moisture, an excess of heat is made available from the heat of combustion of the sludge alone, without other fuel. In fact, with such equipment the heat value of the sludge is sufficient even where the sludge embodies substantially an excess of 75% moisture.

In some cases such as where sludge of lower moisture content is available and where the temperature of the gas and vapor mixture in recuperator 44 may be in excess of that above given as an example, it may be found desirable to pass the air which has been heated in the rabbling structure, from conduit 32 through the recuperator 44 to further preheat such air either with or without the introduction of air at 45. For this purpose these conduits may be arranged as in Fig. 3. However, with the particular example of the operation of equipment above given, the temperatures obtainable in the air supply through recuperator 44, are not sufficiently in excess of the temperature of the cooling conduit air in conduit 32 to justify passing the air through this recuperator.

Under some circumstances it may be found desirable to discharge the excess vapor which accumulates in the drying zones of the furnace from the vapor recirculating system at a point such that the discharged vapor will pass through conduit 35 of recuperator 36 just before it is discharged. In this case the damper 38′ may be closed and a conduit such as indicated at 61 will serve for this purpose. The dampers 38′ or 48′ may be so adjusted so as to cause a desired quantity of the vapor from the drying hearths to be discharged, as compared with the quantity recirculated in the recuperator conduit 38.

Under some circumstances it may be found desirable to withdraw vapor from various portions of the upper zones of the furnace to insure more uniform circulation of vapor in various parts of the drying zones. For this purpose a conduit such as shown at 62 for example, may be provided. A blower as at 63 may be provided to withdraw vapor from the upper hearth at a point opposite the conduit 33 to force such vapor through conduit 62, thence into conduit 38 or the equivalent.

While with the operation of the equipment as above described, the vapor is circulated through the drying hearths in a direction such that the hot vapor rises through the drying zones of the furnace, it may be found desirable under some circumstances to reverse this direction of circulation of the vapor, which may be readily done with the equipment as shown, either by reversing the fan 34 or locating this fan in the conduit 37 whereby the vapor will be drawn downwardly through the drying zones and the excess vapor which is not recirculated may still be withdrawn either through conduit 38 alone or through conduit 61 entering conduit 38. Regardless of whether the vapor is passed downwardly or upwardly through the drying zones, the equipment as shown provides an efficient means for recirculating and reheating this vapor without the necessity of providing any gas seals for the ports in hearth 25 or any of the other hearths within the furnace. Thus several well recognized difficulties of operating and maintaining any such seals is avoided and it is unnecessary to predetermine any sharply defined separation between the drying zones and the incineration zones or areas. However, if desired, the drying portion of the furnace, instead of being integrally embodied with the incineration portion, may be separated therefrom and means may be provided for transferring the dried or partially dried sludge from the drier to the incinerator.

In Fig. 2 an embodiment of the invention somewhat similar to the equipment above described is schematically indicated, corresponding portions being identified by like reference numerals. In Fig. 2, however, it will be noted that the gas and vapor mixture, after passage through conduit 50, passes through the two recuperators 36 and 44 respectively in reverse order as compared with the arrangement in Fig. 1. This enables the intake air supplied to the furnace to be preheated to a somewhat higher temperature, whereas the recirculated vapor for the drying hearths will be heated to a relatively lower temperature as compared with the preheated intake air. As in the case of Fig. 1, the vapor finally withdrawn from the drying zones in Fig. 2, may be taken off at a point either before or after the vapor recirculating stream passes through the recuperator.

While specific examples of operation of the equipment have been given above in connection with the treatment of sewage sludge, it will be understood that the apparatus is similarly adapted to dry and incinerate other waste materials having similar characteristics, so far as concerns their susceptibility to being dried and incinerated in apparatus of this type. For example, the sewage sludge may be mixed with quantities of garbage or trash in such form as may be satisfactorily rabbled through the furnace, and in the appended claims where reference is made to "sewage material", this expression is intended to comprehend such other waste materials, separately or mixed, even though such other waste materials may not in all cases have been delivered to the equipment after passage through a sewage system.

Alternative embodiments of the invention are described and claimed in applicants' copending applications Ser. No. 73,620, filed April 10, 1936, of which this case forms a continuation in part, and Ser. No. 96,576, filed August 18, 1936.

While the invention has been described in detail with respect to certain particular preferred examples which give satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and is desired to be secured by Letters Patent of the United States is:

1. Process of drying and incinerating waste material, which comprises gradually passing the material while agitating the same, first through a drying zone or zones and then through an incinerating zone or zones, causing a stream of air for supporting combustion together with hot gaseous products of combustion to pass over the material in said incinerating zone or zones, withdrawing said stream from said incinerating zone or zones at a temperature sufficiently high for the same to be free of noxious odors, separately withdrawing vapor from said drying zone or zones and also recirculating over the material in said drying zone or zones at least a part of the vapor evolved from the drying material, utilizing heat of said withdrawn stream to heat said withdrawn vapor to a temperature sufficient to destroy noxious odors of the withdrawn vapor, also utilizing such heat to heat intake air for maintaining combustion in the incinerating zone or zones, and to heat said recirculated vapor, whereby the latter provides heat for drying the material.

2. Process of drying and incinerating waste material, which comprises gradually passing the material while agitating the same, first through a drying zone or zones and then through an incinerating zone or zones, causing a stream of air for supporting combustion together with hot gaseous products of combustion to pass over the material in said incinerating zone or zones, withdrawing said stream from said incinerating zone or zones at a temperature sufficiently high for the same to be free of noxious odors, separately withdrawing vapor from said drying zone or zones and also recirculating over the material in said drying zone or zones at least a part of the vapor evolved from the drying material, utilizing heat of said withdrawn stream to heat intake air for maintaining combustion in the incinerating zone or zones, and to heat said recirculated vapor, whereby the latter provides heat for drying the material.

3. Process of drying and incinerating waste material, which comprises gradually passing the material while agitating the same, first through a drying zone or zones and then through an incinerating zone or zones, causing a stream of air for supporting combustion together with hot gaseous products of combustion to pass over the material in said incinerating zone or zones, withdrawing said stream from said incinerating zone or zones at a temperature sufficiently high for the same to be free of noxious odors, separately withdrawing vapor from said drying zone or zones, reintroducing at least a part of said vapor at one of the zones, utilizing heat of said withdrawn stream to heat intake air for maintaining combustion in the incinerating zone or zones, and also to heat said reintroduced vapor, whereby the latter provides heat to aid in maintaining the process.

4. Process of drying and incinerating waste material, which comprises gradually passing the material while agitating the same, first through a drying zone or zones and then through an incinerating zone or zones, causing a stream of air for supporting combustion together with hot gaseous products of combustion to pass counter-current to the material in said incinerating zone or zones, withdrawing said stream from said incinerating zone or zones, separately withdrawing vapor from said drying zone or zones and mixing such withdrawn vapor with said withdrawn stream, said stream being withdrawn through an incinerating zone of a temperature sufficiently high so that the resulting mixture will be of a temperature sufficient to destroy noxious odors of the withdrawn vapor, and utilizing heat of said mixture to heat the drying zone or zones and also to heat said air for supporting combustion.

5. Process of drying and incinerating waste material, which comprises gradually passing the material while agitating the same, first through a drying zone or zones and then through an incinerating zone or zones, causing a stream of air for supporting combustion together with hot gaseous products of combustion to pass over the material in said incinerating zone or zones, withdrawing said stream from said incinerating zone or zones at a temperature sufficiently high for the same to be free of noxious odors, separately withdrawing vapor from said drying zone or zones and also recirculating over the material in said drying zone or zones at least a part of the vapor evolved from the drying material, and utilizing heat of said withdrawn stream to heat said recirculated vapor whereby the latter provides heat for drying the material.

6. Process of drying and incinerating waste material, which comprises gradually passing the material while agitating the same, first through a heated drying zone or zones and then through an incinerating zone or zones, causing a stream of air for supporting combustion together with hot gaseous products of combustion to pass over the material in said incinerating zone or zones, withdrawing said stream from said incinerating zone or zones at a temperature sufficiently high for the same to be free of noxious odors, separately withdrawing vapor from said drying zone or zones, utilizing heat of said withdrawn stream to heat said withdrawn vapor to a temperature sufficient to destroy noxious odors of the withdrawn vapor, and also utilizing such heat to heat intake air for maintaining combustion in the incinerating zone or zones.

7. Process of drying and incinerating waste material which comprises gradually passing the material while agitating the same first through a drying zone or zones and then through an incinerating zone or zones, causing a stream of air for supporting combustion together with hot gaseous products of combustion to pass over the material in said incinerating zone or zones, causing vapor evolved from the drying material in said drying zone or zones to recirculate through said drying zone or zones, and utilizing heat of said stream of gaseous products of combustion to heat said recirculating vapor.

8. Process of drying and incinerating waste material which comprises gradually passing the material while agitating the same first through a drying zone or zones and then through an incinerating zone or zones, causing a stream of air for supporting combustion together with hot gaseous products of combustion to pass over the material in said incinerating zone or zones, causing vapor evolved from the drying material in said drying zone or zones to recirculate through said drying zone or zones, utilizing heat of said stream of gaseous products of combustion to heat said recirculating vapor, and thereafter utilizing heat of said stream of gaseous products of combustion to heat the supply of intake air for supporting combustion in the incinerating zone or zones.

9. The process of drying and incinerating waste material, which comprises passing the material successively through a plurality of zones within which the material is first dried, and then incinerated in the presence of streams of hot gases, withdrawing vapor from a zone of drying, heating a substantial portion of said withdrawn vapor and reintroducing such portion into a zone of drying for recirculation through the drying regions substantially with the exclusion of air after initiation of the process, whereby the drying is effected with an atmosphere of hot vapor, excess portions of said withdrawn vapor being precluded from reentering said drying regions, withdrawing hot gaseous products of combustion from a zone of incineration and bringing such gaseous products into heat interchanging relationship with said vapor from the drying zones to accomplish said heating of said vapor.

10. The process of drying and incinerating waste material, which comprises passing the material successively through a plurality of zones within which the material is first dried, and then incinerated in the presence of a stream of hot gases, conveying vapor from a zone of drying, heating said vapor and reintroducing the same into a zone of drying for recirculation through the drying regions substantially with the exclusion of air after initiation of the process, whereby the drying is effected with an atmosphere of hot vapor, withdrawing the hot gaseous products of combustion from a zone of incineration and bringing such gaseous products into heat interchanging relationship with said vapor from a drying zone to accomplish said heating of said vapor, and also withdrawing vapor from the zone or zones of drying and mixing the same with the hot gaseous products of combustion at a point where the latter are at a temperature sufficient to substantially destroy noxious odors of said withdrawn vapor.

11. The process of treating moist material to dry and burn the same, which comprises passing the material successively through a plurality of zones wherein the material is dried in the first zone or zones and then burned in a subsequent zone or zones, the material being periodically agitated and advanced through each zone and gradually from zone to zone, withdrawing from a zone or zones of drying, vapor evolved from the drying material, heating such withdrawn vapor and then reintroducing the same into the presence of the moist material being treated, withdrawing hot gaseous products of the process from a zone of burning, bringing such hot gaseous products into heat interchanging relationship with said withdrawn vapor to effect said heating of such vapor, thereafter bringing such gaseous products into heat interchanging relationship with a stream of air whereby the latter is heated, and conducting said stream of heated air into the presence of the material being treated.

12. The process of treating waste material to dry and incinerate the same, which comprises passing the material successively through a plurality of zones wherein the material is dried in the first zone or zones and then burned in a subsequent zone, the material being periodically agitated and advanced through each drying zone and into the burning zone, withdrawing from further contact with the material, the hot gaseous products of combustion from a zone of burning, withdrawing from a zone of drying, vapor evolved from the drying material, mixing such withdrawn vapor with said hot gaseous products, such mixing being effected at a point where such products are at a temperature sufficient to substantially destroy noxious odors of said withdrawn vapor, then utilizing heat of such mixture to heat a zone or zones of drying, and thereafter utilizing remaining heat of said mixture to preheat a supply of intake air for supporting combustion in the burning zone.

13. Apparatus for drying and incinerating waste material, comprising a furnace having a plurality of superposed hearths, including a top hearth or hearths for drying and a lower hearth or hearths for incinerating the material, rotary rabbling means cooperating with each hearth for periodically agitating and advancing the material over each hearth in succession and gradually from hearth to hearth down through the furnace, exit means at an incinerating hearth for the gaseous products of combustion evolved from the burning material, means for conveying vapor evolved from the drying material, from said drying hearth or hearths and for mixing such vapor with the hot gaseous products of combustion for destruction of odors of said vapor, and a pair of heat exchanging devices with connections whereby the mixture of hot vapor and gaseous products passes therethrough in succession, one of said devices being connected to transfer heat to vapor evolved from the drying material, and the other of said devices being connected to preheat a supply of intake air for the furnace.

14. The method of drying and incinerating waste material, which comprises passing the material in succession through a plurality of drying zones while agitating the material and gradually advancing it through each zone and from zone to zone in the presence of an atmosphere, the greater part of which comprises a stream of hot vapor evolved from the drying material, then burning the dried material in an incinerating zone or zones in the presence of a stream of heated air and hot gases of combustion evolved from the burning material, conducting vapor from the drying zones and mixing the same with said hot gas stream at a point where the latter is at a temperature sufficient to destroy obnoxious odors in the resulting hot mixture, and utilizing a substantial portion of the heat of said hot mixture to heat said drying zones, without bringing said mixture into direct contact with the material in said drying zones, such heating of the drying zones being effected by bringing said mixture into close and extended heat interchanging relationship with the vapor stream which passes over the drying material.

15. The method of drying moist waste material, which comprises agitating and gradually advancing the material as a substantially horizontal layer through a heated zone and in the presence of an atmosphere of hot vapor evolved from the material, with the exclusion of any air sufficient to support combustion, causing a substantial portion of the vapor evolved from the material to repeatedly pass over said layer, while utilizing such portion as a carrier of heat from a source of heat to said layer, and meanwhile withdrawing other portions of said vapor from the process.

16. The method of drying moist waste material, which comprises agitating and gradually advancing the material as an extended layer through a heated zone and in the presence of an atmosphere of hot vapor with the exclusion of any substantial amount of air, causing a substantial portion of the vapor evolved from the material to repeatedly pass over the material in said zone, while utilizing such portion as a carrier of heat from a source of heat to said layer, and meanwhile withdrawing other portions of said vapor from said zone through another zone maintained at a higher temperature for destruction of odors of the vapor before its discharge from the process.

17. Apparatus for drying and incinerating waste material, comprising a furnace having a plurality of superposed hearths, including a top hearth or hearths for drying and a lower hearth or hearths for incinerating the material, rotary rabbling means cooperating with each hearth for periodically agitating and advancing the material over each hearth in succession and gradually from hearth to hearth down through the furnace, means for withdrawing from the furnace at an upper incinerating hearth, the hot gaseous products of combustion evolved from the burning material on the incinerating hearth or hearths, means for conveying vapor evolved from the drying material, from said drying hearth or hearths and for mixing such vapor with said withdrawn gaseous products at a point outside the furnace where said gaseous products are at a temperature sufficient to destroy obnoxious odors of said vapor, and means for also utilizing heat of said withdrawn gaseous products for heating said drying hearth or hearths.

18. In the art of drying and incinerating materials, the process comprising the steps of feeding the material progressively through a drying zone and through an incinerating zone, discharging the residue, passing a current of hot gases through the drying zone in contact with the material and in the same direction as the travel of the material, returning the gases to recirculate in the same path, supplying combustion air at the discharge end of the incinerating zone and taking off products of combustion at the point where the dried material enters the combustion zone, and adding heat from the combustion gases to the drying gases before recirculating them.

19. The process according to claim 18 and further comprising transferring heat from the combustion gases to the combustion air, and discharging the excess of drying gases to mingle with, be deodorized by, and be discharged with the combustion gases.

20. In apparatus of the class described the combination of a drying and incinerating furnace, means to feed material in at one end of the furnace and to move it progressively through a drying zone and into and through a combustion zone, means to discharge the unburnt residue, means to cause drying gases to circulate from the point of the drying zone where the material enters through and out of the drying zone and back to the inlet, means to cause combustion air to enter at the point of the combustion zone where the residue is discharged, means to discharge combustion gases from the combustion zone at the point where the material enters the combustion zone, and means to transfer heat from the combustion gases to the drying gases before returning them to the drying zone.

21. In apparatus comprising a plurality of superimposed spaced annular hearths in a vertical cylindrical housing alternate hearths having discharge openings adjacent to the center and the remainder having discharge means adjacent to the circumference, means to feed material to the top hearth, means to remove residue from the bottom of the apparatus, and rabbles to move the material across the hearths to the discharge openings, the combination of said elements with a duct leading from a point where the material is dry enough for combustion to a point adjacent to the inlet end for the material, means to create a flow of drying gases from the former point through the duct to the latter point and then across the hearths to the former point, a duct to supply combustion air to a point at the discharge end for the residue, and a duct to remove products of combustion from a point where combustion begins, and comprising further heat transfer means through which the drying gases and the products of combustion flow in heat transfer relation but without mingling and thereafter the combustion air and the products of combustion flow in heat transfer relation but without mingling.

HENRY J. HARTLEY.
DUDLEY BAIRD.